US006231981B1

(12) United States Patent
Hareyama

(10) Patent No.: US 6,231,981 B1
(45) Date of Patent: May 15, 2001

(54) CARBON-COATED POWDER OF TITANIA CONTAINING TITANIUM NITRIDE AND PROCESS FOR PRODUCING THE SAME

(75) Inventor: Yukiya Hareyama, Tokushima (JP)

(73) Assignee: Otsuka Kagaku Kabushiki Kaisha, Osaka (JP)

( * ) Notice: Subject to any disclaimer, the term of this patent is extended or adjusted under 35 U.S.C. 154(b) by 0 days.

(21) Appl. No.: 09/381,574

(22) PCT Filed: Feb. 3, 1999

(86) PCT No.: PCT/JP99/00448

§ 371 Date: Sep. 22, 1999

§ 102(e) Date: Sep. 22, 1999

(87) PCT Pub. No.: WO99/40028

PCT Pub. Date: Aug. 12, 1999

(30) Foreign Application Priority Data

Feb. 4, 1998 (JP) .................................................. 10-041052

(51) Int. Cl.[7] .............................. B32B 5/16; C01G 23/08
(52) U.S. Cl. ............................ 428/403; 423/81; 423/351; 423/364; 423/445 R; 423/598; 423/610; 428/404; 428/698; 428/702

(58) Field of Search ................................. 428/403, 404, 428/702, 698; 423/81, 351, 364, 598, 610, 445 R

(56) References Cited

U.S. PATENT DOCUMENTS

| 3,723,601 | * | 3/1973 | Svanstrom | 423/297 |
|---|---|---|---|---|
| 4,812,301 | * | 3/1989 | Davidson et al. | 423/440 |
| 5,308,367 | * | 5/1994 | Julien | 51/293 |
| 5,360,772 | * | 11/1994 | Hayashi et al. | 501/95 |
| 5,417,952 | * | 5/1995 | Koc et al. | 423/380 |
| 5,665,326 | * | 9/1997 | Goel et al. | 423/411 |
| 5,756,410 | * | 5/1998 | Dunmead et al. | 501/96.1 |

OTHER PUBLICATIONS

Patent Abstracts of Japan; Publication No. 08–073220; Publication Date Mar. 19, 1996.
Patent Abstracts of Japan; Publication No. 08–165115; Publication Date Jun. 25, 1996.
Patent Abstracts of Japan; Publication No. 07–053217; Publication Date Feb. 28, 1995.

* cited by examiner

Primary Examiner—Hoa T. Le
(74) Attorney, Agent, or Firm—Kubovcik & Kubovcik

(57) ABSTRACT

A carbon-coated titania powder containing titanium nitride in which at least part of the surface of the titania powder containing titanium nitride is coated with carbon.

20 Claims, No Drawings

CARBON-COATED POWDER OF TITANIA CONTAINING TITANIUM NITRIDE AND PROCESS FOR PRODUCING THE SAME

TECHNICAL FIELD

The present invention relates to a carbon-coated titania powder containing titanium nitride which is suitably used as resin reinforcing material, conductive filler or the like, and a method of preparing the same.

BACKGROUND ART

Heretofore, as a conductive filler incorporated into resin or the like, there has been known a potassium titanate fiber and titania fiber to which conductivity is afforded by coating the fiber surface with a conductive substance, or by producing oxygen deficiency by means of reductive calcination. Since these fibers are excellent in reinforcing property, dispersibility and conductivity, they are put into practice for uses, such as the prevention of electrification, electromagnetic wave shield, and electrode material.

Meanwhile, in the recent years, fillers having more superior conductivity have been developed which can render the desired conductivity in a smaller amount. One superior method is to subject a titanate fiber to nitriding such that part of or the overall fiber is converted to titanium nitride. This method enables to render high conductivity without impairing the strength of the fiber.

For instance, there are known a method in which a fibrous titania or titania hydrate is heated and reduced at a temperature of 500 to 1000° C. in a reducing atmosphere containing ammonia gas, to obtain a conductive acid titanium nitride fiber (JP-A-215718/1989), and a method in which a potassium titanate fiber is calcinated with heating in an atmosphere of ammonia gas, to obtain a potassium titanate fiber, part of which has been converted to titanium nitride (JP-A-27573/1993).

Unfortunately, both methods have the following drawbacks. That is, since they require heat treatment in an atmosphere of ammonia gas, meticulous care should be taken in avoiding leakage to the surroundings, and it is difficult to adjust the partial pressure of ammonia gas in the atmosphere. Further, in order to obtain a high degree of nitriding, it is necessary to continue the reaction for a long period of time because the reduction reaction proceeds predominantly than the nitriding reaction. This can cause deformation of the starting fiber shape.

Furthermore, the fibers obtained by the above methods have high hardness because part of the fiber surface is directly exposed as titanium nitride. Therefore, when the fiber is used as a filler for resin, it is liable to wear a molding die. Additionally, a resin composition incorporating this fiber is poor in slidability and wear resistance.

An object of the present invention is to provide a conductive powder which is excellent in reinforcing property and conductivity, as well as slidability and wear resistance, and can prevent wear of dies.

Another object of the present invention is to provide a conductive powder having good conductivity which can be prepared at a relatively low temperature and in a short period of time.

DISCLOSURE OF THE INVENTION

The present invention relates to a carbon-coated titania powder containing titanium nitride in which at least part of the surface of the titania powder containing titanium nitride is coated with carbon, and a method of preparing the same. Hereinafter, the carbon-coated titania powder containing titanium nitride is referred to merely as "composite powder" in some cases. The term "powder" as used in this specification includes ones in a variety of shapes, such as granular powder, fibrous powder and scalelike powder.

As representative titania or titanate compound (hereinafter referred to as "titanium source compound" in some cases) to be used as the raw material in the present invention, there can be exemplified potassium 4-titanate, potassium 6-titanate, potassium 8-titanate, sodium titanate, barium titanate, calcium titanate, titania hydrate, monoclinic titania, anatase and rutile. The titanium source compound is not specifically limited to the above. Especially preferred is a titania fiber of potassium 4-titanate, potassium 6-titanate, potassium 8-titanate or monoclinic titania, having a fiber shape with a fiber length of about 1 to 20 $\mu$m and a fiber diameter of about 0.1 to 1 $\mu$m. With this fiber, it is possible to obtain a filler with high reinforcing property.

As a nitrogenous organic compound suitable for use as the starting material in preparing a composite powder of the invention, there can be exemplified melamine, (meth)acrylamide and dicyandiamide, without limitation, of these, melamine is preferred because of high efficiency of nitriding.

The ratio of nitrogenous organic compound to titanium source compound is not limited specifically, but it is usually in the range of Ti/N (mole ratio)=1/1 to 1/10. When the ratio of N is too small, nitriding might not proceed sufficiently to provide insufficient conductivity. Even with an excessive ratio of N, since the amount of N correlated to nitriding under this conditions is limited, an excess is a waste and hence less economical.

In one preferred method of preparing a composite powder of the invention, preferably a titanium source compound in a fibrous powder and preferably a nitrogenous organic compound in a powdery solid are mixed in powdery state, followed by heat treatment in a non-oxidizing atmosphere. Thereby, the nitrogenous organic compound is decomposed, and all of the reactions of partial nitriding, reduction and carbon coating by carbonization take place at the same time, to the titanium source compound. Also, when the titanium source compound is titanate, part of or the overall alkali metal and the like are removed, thereby obtaining a composite powder of the invention.

Examples of non-oxidizing atmosphere are nitrogen gas, argon gas and ammonia gas atmospheres. Of these, nitrogen gas is preferred because it is safe and inexpensive. As means of calcination with heating, a variety of means such as electric furnace, gas furnace, rotary kiln and continuous furnace can be employed insofaras the above-mentioned atmosphere is ensured.

Suitable heating temperature is above the temperature at which a nitrogenous organic compound decomposes, that is, it is usually about 400 to 1200° C., preferably about 700 to 1100° C. In accordance with a method of the invention, however, even at relatively low temperatures, that is, substantially under 1000° C., for example, 700 to 900° C., the nitriding of the starting titanium source compound proceeds and titanium nitride is formed. This enables to obtain the desired substance having a sufficient conductivity. Suitable heating time is usually about 0.5 to 24 hours, preferably about 1 to 5 hours.

The obtained conductive composite powder may be, as required, subjected to washing with water, washing with acid, grinding, fine pulverization, and classification or surface treatment using a coupling agent, etc., in order to remove impurities, obtain a uniform shape, and improve kneading property to resin.

A composite powder of the invention preferably comprises 1 to 70% by weight of titanium nitride, more preferably 5 to 25% by weight of titanium nitride. Less titanium nitride content is undesirable because it causes a decrease in conductivity. For a fibrous substance, an excess titanium nitride content is undesirable because the fiber loses its shape.

Titania part is reduced such as to be $TiO_{2-x}$ ($0.1 \leq x \leq 1.5$), thereby increasing conductivity. A carbon-coated layer on the powder surface is preferably about 1 to 30% by weight. The carbon-coated layer does not necessarily coat the entire surface of a composite powder, and at least part of the surface may be coated. The carbon-coated part lowers the hardness of the powder surface to improve slidability, and also contributes to the manifestation of conductivity. In a composite powder of the invention, impurity such as alkali metal derived from the starting material or the like may be contained somewhat, for example, from 0 to 10% by weight.

A composite powder of the invention can be suitably used as the material of additives to a matrix such as plastics, ceramics, coating composition and metal, which are aimed at rendering and improving conductivity, reinforcing property, decorative property and thermal conductivity. Although the ratio of a composite powder of the invention to a matrix can be determined suitably depending upon the property to be rendered, it may be usually about 2 to 98% by weight.

A composite powder of the invention is especially suitable for use as a filler for conductive coating composition or conductive film. In one preferred method of preparing a conductive coating composition by using a composite powder of the invention, the composite powder is admixed, as required, with a variety of organic binders, together with various additives for coating which may be incorporated thereto. In one preferred method of preparing a conductive film, a composite powder of the invention is admixed, as required, with a variety of organic binders, together with various additives for film which may be incorporated thereto, and the mixture is then subjected to calender molding, extrusion molding or applied to a substrate by use of a doctor blade, followed by drying and removing the substrate.

As the organic binder suitable for use as a matrix for a conductive coating composition and conductive film, there are, for example, thermosetting resin and solvent-soluble type or emulsion type thermoplastic resin. Examples thereof are polyvinyl alcohol resin, vinyl chloride-vinyl acetate resin, acrylic resin, urethane resin, fluorine-containing resin, modified fluorine-containing resin, epoxy resin, alkyd resin, polyester resin, ethylene-vinyl acetate copolymer, acrylic-styrene copolymer, phenol resin, amino resin, silicon resin, polyolefin resin and polyamide resin.

In addition, a composite powder of the invention is also suitable for use as a conductive filler for conductive paste or conductive ink. When preparing a conductive coating composition, conductive paste or conductive ink by using a composite powder of the invention, a conductive powder other than the composite powder of the invention may be added suitably as required.

Conductive coating composition, conductive paste and conductive ink which are prepared by using a composite powder of the invention are suitably used in shielding electromagnetic wave and preventing electrification of the flooring material for clean room, etc., and also suitable for use as the conductive material and resistor for electric circuit, sensor material, electrodes, etc.

Plastics incorporating a composite powder of the invention is useful for such applications as the material for static electricity prevention, electrification prevention and electromagnetic wave shield, and is also useful as plastics material with good slidability, high strength and excellent plating property.

BEST MODE OF CARRYING OUT THE INVENTION

The present invention will be described in more detail with reference to the following Examples and Comparative Examples. Measuring method is described as below. Volume Intrinsic Resistivity (on the basis of JIS K 6901):

Sample (0.5 g) was loaded into a cylindrical vessel made of bakelite (the diameter of a sample loading part: 10 mm) and, while a pressure of 50±1 $kg/cm^2$ was applied thereto, the electric resistance R ($\Omega$) at upper and lower ends, thickness d (cm) and cross-sectional area s ($cm^2$) of the compressed sample were measured. Its volume intrinsic resistivity ρ ($\Omega \cdot cm$) was determined from the following equation:

$$\rho(\Omega \cdot cm) = R(\Omega) \times s(cm^2)/d(cm)$$

Analysis of Composition:

Measurement was made by chemical analysis using X-ray diffraction, X-ray fluorescence analysis, and a CHN coder (product number: MT-3, manufactured by YANAGIMOTO MFG. Co., Ltd.).

Fiber Shape:

The mean fiber length ($\mu$m) of a fibrous substance was measured on an image analyzer (LUZEX, manufactured by NIRECO CORPORATION).

EXAMPLE 1 and 2

A potassium 8-titanate fiber (TISMO-D, mean fiber length: 14 $\mu$m, manufactured by Otsuka Kagaku Kabushiki Kaisha) or a monoclinic titania fiber (MTW, mean fiber length: 7 $\mu$m, manufactured by Otsuka Kagaku Kabushiki Kaisha) and melamine (first class grade reagent, manufactured by Wako Pure Chemical Industries, Ltd.) were mixed in powdery state at a 1:3 ratio by weight, followed by heat treatment in an atmosphere of nitrogen at 850° C. for one hour, to obtain a product. Table 1 shows the content of titanium nitride, carbon coating amount, volume intrinsic resistivity, and mean fiber length of this product.

COMPARATIVE EXAMPLE 1

Only the potassium 8-titanate fiber as described was subjected to heat treatment in an atmosphere of nitrogen at 850° C. for one hour, to obtain a product. The above-mentioned characteristics of this product are given in Table 1.

COMPARATIVE EXAMPLE 2

Only the potassium 8-titanate fiber as described was subjected to heat treatment in an atmosphere of ammonia gas at 850° C. for one hour, to obtain a product. The above-mentioned characteristics of this product are given in Table 1.

COMPARATIVE EXAMPLE 3 and 4

While a gasified toluene was supplied to the potassium 8-titanate fiber as described or the monoclinic titania fiber as described at a 3:1 ratio by weight, heat treatment was performed in an atmosphere of nitrogen at 850° C. for one hour, to obtain a product. The above-mentioned characteristics of this product are given in Table 1.

TABLE 1

|  | volume intrinsic resistivity (Ω · m) | content of TiN (wt %) | carbon coating amount (wt %) | mean fiber length (μm) |
|---|---|---|---|---|
| Ex. 1 | $3 \times 10^{-3}$ | 11 | 3.5 | 12.6 |
| Ex. 2 | $2 \times 10^{-3}$ | 13 | 4.2 | 5.8 |
| Com. Ex. 1 | $6 \times 10^{4}$ | 0 | 0 | 13.2 |
| Com. Ex. 2 | $1 \times 10^{3}$ | 0 | 0 | 12.9 |
| Com. Ex. 3 | $4 \times 10^{-1}$ | 0 | 6.3 | 13.0 |
| Com. Ex. 4 | $3 \times 10^{0}$ | 0 | 4.8 | 6.1 |

INDUSTRIAL APPLICABILITY

In accordance with the present invention, it is possible to obtain a conductive powder which is excellent in reinforcing property and conductivity, as well as slidability and wear resistance, and which can prevent wear of dies.

It is also possible to obtain a conductive powder having excellent conductivity which can be prepared at a relatively low temperature in a short period of time.

What is claimed is:

1. A carbon-coated titania powder containing titanium nitride in which at least part of the surface of the titania powder containing titanium nitride is coated with carbon.

2. A powder as set forth in claim 1 having a fiber shape with a fiber length of 1 to 20 μm and a fiber diameter of 0.1 to 1 μm.

3. A method of preparing a carbon-coated titania powder containing titanium nitride of claim 2, characterized in that titania or titanate compound is calcinated with heating in a non-oxidizing atmosphere in the presence of a nitrogen-containing organic compound.

4. A method as set forth in claim 3 wherein the nitrogen-containing organic compound is melamine.

5. A method as set forth in claim 3, wherein the temperature of the calcination with heating is 700 to 1100° C.

6. A method as set forth in claim 5 wherein the temperature of the calcination with heating is 700 to 900° C.

7. A powder as set forth in claim 1 which contains titanium nitride (TiN) in an amount of 5 to 25% by weight.

8. A method of preparing a carbon-coated titania powder containing titanium nitride of claim 7, characterized in that titania or titanate compound is calcinated with heating in a non-oxidizing atmosphere in the presence of a nitrogen-containing organic compound.

9. A method as set forth in claim 8 wherein the nitrogen-containing organic compound is melamine.

10. A method as set forth in claim 8, wherein the temperature of the calcination with heating is 700 to 1000° C.

11. A method as set forth in claim 10 wherein the temperature of the calcination with heating is 700 to 900° C.

12. A powder as set forth in claim 1 wherein the amount of coated carbon is 1 to 30% by weight.

13. A method of preparing a carbon-coated titania powder containing titanium nitride of claim 12, characterized in that titania or titanate compound is calcinated with heating in a non-oxidizing atmosphere in the presence of a nitrogen-containing organic compound.

14. A method as set forth in claim 13 wherein the nitrogen-containing organic compound is melamine.

15. A method as set forth in claim 13, wherein the temperature of the calcination with heating is 700 to 1100° C.

16. A method as set forth in claim 15 wherein the temperature of the calcination with heating is 700 to 900° C.

17. A method of preparing a carbon-coated titania powder containing titanium nitride of claim 1, characterized in that titania or titanate compound is calcinated with heating in a non-oxidizing atmosphere in the presence of a nitrogen-containing organic compound.

18. A method as set forth in claim 17 wherein the nitrogen-containing organic compound is melamine.

19. A method as set forth in claim 17 wherein the temperature of the calcination with heating is 700 to 1100° C.

20. A method as set forth in claim 19 wherein the temperature of the calcination with heating is 700 to 900° C.

* * * * *